United States Patent
Guen

(10) Patent No.: US 10,236,494 B2
(45) Date of Patent: Mar. 19, 2019

(54) SECONDARY BATTERY

(71) Applicant: SAMSUNG SDI CO., LTD., Yongin-si, Gyeonggi-do (KR)

(72) Inventor: Minhyung Guen, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 258 days.

(21) Appl. No.: 15/227,523

(22) Filed: Aug. 3, 2016

(65) Prior Publication Data

US 2017/0162852 A1   Jun. 8, 2017

(30) Foreign Application Priority Data

Dec. 3, 2015   (KR) .................. 10-2015-0171543

(51) Int. Cl.
| | | |
|---|---|---|
| *H01M 2/00* | (2006.01) | |
| *H01M 2/34* | (2006.01) | |
| *H01M 2/30* | (2006.01) | |
| *H01M 2/22* | (2006.01) | |

(52) U.S. Cl.
CPC ............. *H01M 2/34* (2013.01); *H01M 2/22* (2013.01); *H01M 2/30* (2013.01); *H01M 2200/103* (2013.01)

(58) Field of Classification Search
CPC ............ H01M 2/34; H01M 2/30; H01M 2/22; H01M 2200/103
See application file for complete search history.

(56) References Cited

U.S. PATENT DOCUMENTS

| | | | |
|---|---|---|---|
| 2012/0183817 A1* | 7/2012 | Guen ............... | H01M 2/30 429/61 |
| 2012/0258356 A1* | 10/2012 | Kim ................. | H01M 2/06 429/179 |
| 2013/0017420 A1 | 1/2013 | Byun et al. | |
| 2014/0315053 A1 | 10/2014 | Byun et al. | |
| 2015/0093609 A1 | 4/2015 | Byun | |
| 2015/0093610 A1 | 4/2015 | Byun et al. | |
| 2015/0243961 A1* | 8/2015 | Urano ............... | H01M 2/06 429/61 |

FOREIGN PATENT DOCUMENTS

| | | |
|---|---|---|
| KR | 10-2013-0008223 A | 2/2013 |
| KR | 10-2014-0124999 A | 10/2014 |
| KR | 10-2015-0035205 A | 4/2015 |
| KR | 10-2015-0039075 A | 4/2015 |

* cited by examiner

*Primary Examiner* — Cynthia H Kelly
*Assistant Examiner* — Monique M Wills
(74) *Attorney, Agent, or Firm* — Lee & Morse, P.C.

(57) ABSTRACT

A secondary battery may include a fuse formed in an electrode terminal. In exemplary embodiments, the secondary battery may include an electrode assembly including a first electrode plate, a second electrode plate and a separator, a current collector plate electrically connected to the electrode assembly, a case accommodating the electrode assembly, the current collector plate and an electrolyte, and an electrode terminal electrically connected to the current collector plate and protruded to an outside of the case, wherein the electrode terminal portion includes a protrusion part electrically connected to the current collector plate in a normal condition and selectively electrically disconnectable therefrom.

10 Claims, 5 Drawing Sheets

SECONDARY BATTERY

CROSS-REFERENCE TO RELATED APPLICATION

Korean Patent Application No. 10-2015-0171543, filed on Dec. 3, 2015, in the Korean Intellectual Property Office, and entitled: "Secondary Battery," is incorporated by reference herein in its entirety.

BACKGROUND

1. Field

Exemplary embodiments relate to a secondary battery.

2. Description of the Related Art

In general, secondary batteries are repeatedly charged and discharged, unlike primary batteries which are not. A low capacity battery including a battery cell in the form of a pack may be used for small portable electronic devices, e.g., cellular phones and camcorders, and a high capacity battery including dozens of battery cells connected to one another may be used as a motor-driving power source for electric scooters, hybrid vehicles, or electric vehicles.

Secondary batteries may be manufactured in various shapes, including prismatic, cylindrical and pouch shapes. Each of the unit batteries typically includes an electrode assembly having a positive electrode, a negative electrode, and a separator between the positive and negative electrodes.

SUMMARY

Exemplary embodiments are directed to a secondary battery may include an electrode assembly including a first electrode plate, a second electrode plate and a separator, a current collector plate electrically connected to the electrode assembly, a case accommodating the electrode assembly, the current collector plate and an electrolyte, and an electrode terminal portion electrically connected to the current collector plate and protruded to an outside of the case, wherein the electrode terminal portion includes a protrusion part electrically connected to the current collector plate in a normal condition and selectively electrically disconnectable therefrom.

The electrode terminal portion may further include an insulation member, and the protrusion part may pass through the insulation member to be electrically connected to the current collector plate.

The electrode terminal portion may include a flange horizontally extending from a side portion of the electrode terminal portion and the insulation member may be installed between the flange and the current collector plate.

An electrode tab may be electrically connected to one end of the current collector plate and the protrusion part of the electrode terminal portion may be electrically connected to another end of the current collector plate.

The protrusion part may include a plurality of protrusions.

The protrusions may be spaced equidistant from an electrode tab.

The protrusions may be sequentially formed in a lengthwise direction of the current collector plate, such that one protrusion is closer to an electrode tab than another protrusion.

The electrode terminal portion may include a first electrode terminal and a second electrode terminal, and the protrusion part may be on the first electrode terminal.

The second electrode terminal may be electrically connected to a second current collector plate.

The protrusions of the first electrode terminal may have a narrower current path between the first electrode terminal and the current collector plate than a current path between the second electrode terminal and the second current collector plate.

The electrode terminal portion may further include a body part and a flange extending from a bottom side of the body part, the protrusion part may be under the body part and the flange.

A diameter of the protrusion part may be less than a diameter of the body part.

An electrical connection between the current collector plate and the electrode terminal portion may be broken, when an over-current flows.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
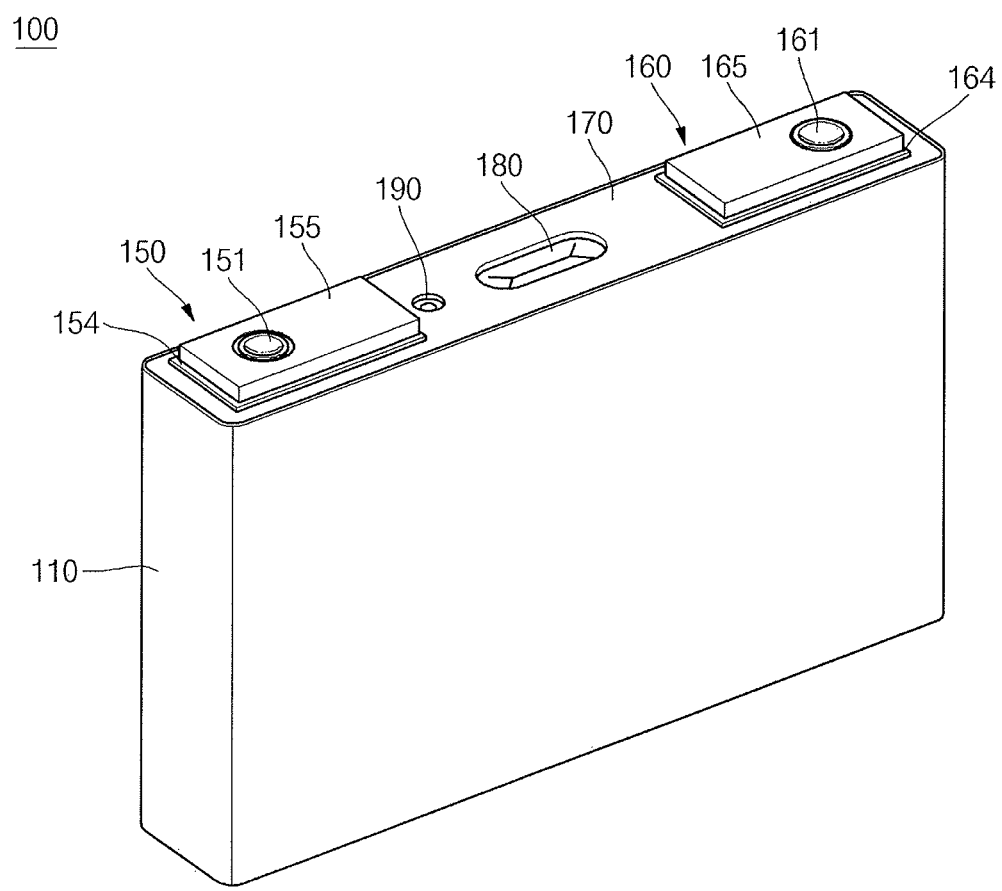
FIG. 1 illustrates a perspective view of a secondary battery according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

As used herein, the term "and/or" includes any and all combinations of one or more of the associated listed items.

In addition, it will be understood that when an element A is referred to as being "connected to" an element B, the element A can be directly connected to the element B, or an intervening element C may be present between the elements A and B so that the element A can be indirectly connected to the element B. It will also be understood that when an element is referred to as "bent," this expression does not limit the configuration to an element formed or shaped by a bending process, but includes any such angled, curved, or similarly shaped configuration created by any suitable process.

In addition, the terminology used herein is for the purpose of describing particular embodiments only and is not intended to be limiting thereof. As used herein, the singular forms are intended to include the plural forms as well, unless the context clearly indicates otherwise. It will be further understood that the terms "comprises" or "include" and/or "comprising" or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer, and/or section from another. Thus, for example, a first member, a first element, a first region, a first layer and/or a first section discussed below could be termed a second member, a second element, a second region, a second layer and/or a second section without departing from the teachings.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below.

Figure 2:
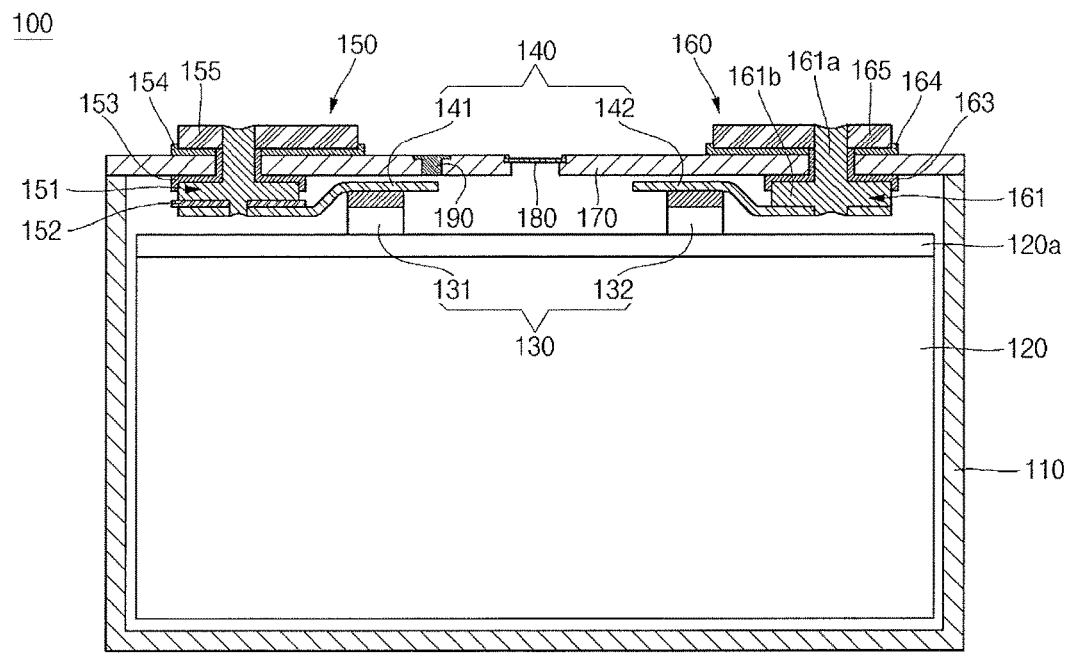
FIG. 2 illustrates a cross-sectional view illustrating an internal structure of a case in the secondary battery shown in FIG. 1.

FIG. 1 is a perspective view of a secondary battery according to an exemplary embodiment and FIG. 2 is a cross-sectional view illustrating an internal structure of a case in the secondary battery shown in FIG. 1.

Referring to FIGS. 1 and 2, the secondary battery 100 according to an exemplary embodiment may include a case 110, an electrode assembly 120, an electrode tab 130, a current collector plate 140, a first electrode terminal portion 150, a second electrode terminal portion 160, a cap plate 170, a safety vent 180, and an electrolyte injection unit 190.

The case 110 may have a substantially hexahedral shape having an opening through which the electrode assembly 120 may be inserted and arranged. The case 110 may have a space inside the opening to accommodate the electrode assembly 120 and an electrolyte. The case 110 may be made of a metal, such as aluminum or an aluminum alloy, for example. In addition, the electrolyte may include an organic solvent and a lithium salt, for example. The electrolyte may exist in a liquid phase, a solid phase, or a gel phase. Exemplary embodiments do not limit the material of the case 110 to those disclosed herein.

The electrode assembly 120 may include a first electrode plate, a second electrode plate and a separator interposed between the first electrode plate and the second electrode plate, which may be formed as plates or layers. The electrode assembly 120 may be formed by, e.g., winding or laminating a stacked structure including the first electrode plate, the second electrode plate, and the separator. Here, the first electrode plate may be a positive electrode plate or a negative electrode plate and the second electrode plate may have an opposite polarity to the first electrode plate. The following description will be made assuming that the first electrode plate is a positive electrode plate the second electrode plate is a negative electrode plate.

The first electrode plate may be formed by applying a first electrode active material, e.g., a lithium-based oxide, on both surfaces of the first electrode plate formed of a metal foil, e.g., an aluminum foil. The second electrode plate may be formed by applying a second electrode active material, e.g., a carbonaceous material, on both surfaces of the second electrode plate formed of a metal foil, e.g., a copper foil. Each of the first electrode plate and the second electrode plate may include an uncoated portion 120a that functions as a passage for current flowing between each of the first and second electrode plates and the outside of each of the first and second electrode plates.

In addition, the separator may be disposed between the first electrode plate and the second electrode plate to prevent short circuiting and to allow the movement of lithium ions. The separator may be formed of, e.g., polyethylene, polypropylene, or a composite film of polypropylene and polyethylene.

Exemplary embodiments do not limit materials of the first electrode plate, the second electrode plate, and the separator to those disclosed herein.

The electrode tab 130 may include a first electrode tab 131 and a second electrode tab 132.

The first electrode tab 131 may be formed by stacking a tab extending from one side of the uncoated portion of the first electrode plate or by electrically connecting a separate tab to one side of the first electrode plate. The first electrode tab 131 may be formed of a metal, such as aluminum, for example.

The second electrode tab 132 may also be formed by stacking a tab extending from one side of the uncoated portion of the second electrode plate or by electrically connecting a separate tab to one side of the second electrode plate. The second electrode tab 132 may be formed of a metal, such as copper, for example. Exemplary embodiments do not limit materials of the first electrode tab 131 and the second electrode tab 132 to those disclosed herein.

The current collector plate 140 may be coupled to the electrode tab 130 and may establish an electrical path for the electrode tab 130. The current collector plate 140 may include a first current collector plate 141 and a second current collector plate 142.

The first current collector plate 141 may include an electrode tab connecting part 141a and an electrode terminal connecting part 141b, and an electrode terminal hole 141c may be formed in the electrode terminal connecting part 141b.

The electrode tab connecting part 141a may have an end electrically connected to the first electrode tab 131 and may be extended along the cap plate 170 to be connected to the electrode terminal connecting part 141b. A protrusion part 151c of the first electrode terminal 151 may be fitted into and coupled to the electrode terminal hole 141c, thereby electrically connecting the electrode terminal connecting part 141b to the first electrode terminal 151. If a height at which the electrode tab connecting part 141a may be connected to the first electrode tab 131 is different from a height at which the electrode terminal connecting part 141b may be connected to the first electrode terminal 151, a region between the electrode tab connecting part 141a and the electrode terminal connecting part 141b may be bent so that the electrode tab connecting part 141a and the electrode terminal connecting part 141b may be connected to each other.

In addition, the first current collector plate 141 may not be formed at a cutout region 141d under the electrolyte injection unit 190. The first current collector plate 141 may be made of a metal, such as aluminum or an aluminum alloy, for example.

The second current collector plate 142 may also include an electrode tab connecting part and an electrode terminal connecting part, and an electrode terminal hole may be formed in the electrode terminal connecting part.

The electrode tab connecting part may have an end electrically connected to the second electrode tab 132 and may be extended along the cap plate 170 to be connected to the electrode terminal connecting part. A bottom part of the second electrode terminal 161 may be fitted into and coupled to the electrode terminal connecting part, thereby electrically connecting the electrode terminal connecting part to the second electrode terminal 161. In addition, if a height at which the electrode tab connecting part may be connected to the second electrode tab 132 is different from a height at which the electrode terminal connecting part may be connected to the second electrode terminal 161, a region between the electrode tab connecting part and the electrode terminal connecting part may be bent so that the electrode tab connecting part and the electrode terminal connecting part may be connected to each other.

In addition, the second current collector plate 142 may be made of a metal, such as copper or a copper alloy, for example.

Exemplary embodiments do not limit materials of the first current collector plate 141 and the second current collector plate 142 to those disclosed herein.

Figure 3:
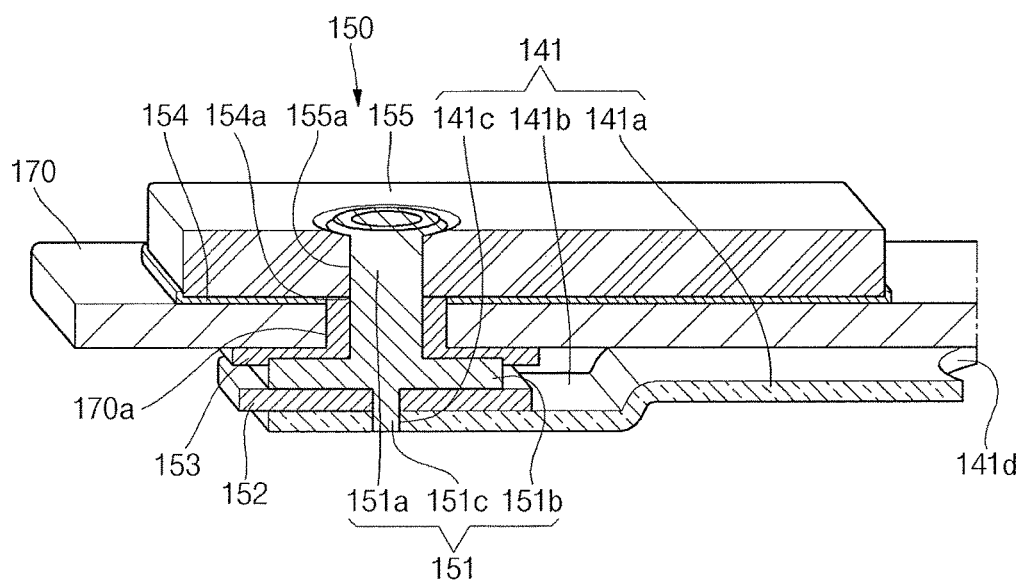
FIG. 3 illustrates a perspective view of a first electrode terminal portion of the secondary battery shown in FIG. 1.
Figure 4:
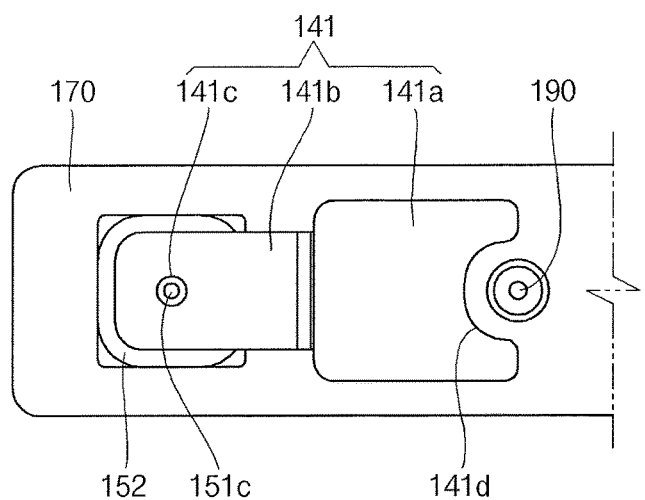
FIG. 4 illustrates a bottom view of the first electrode terminal portion shown in FIG. 3.
Figure 5:
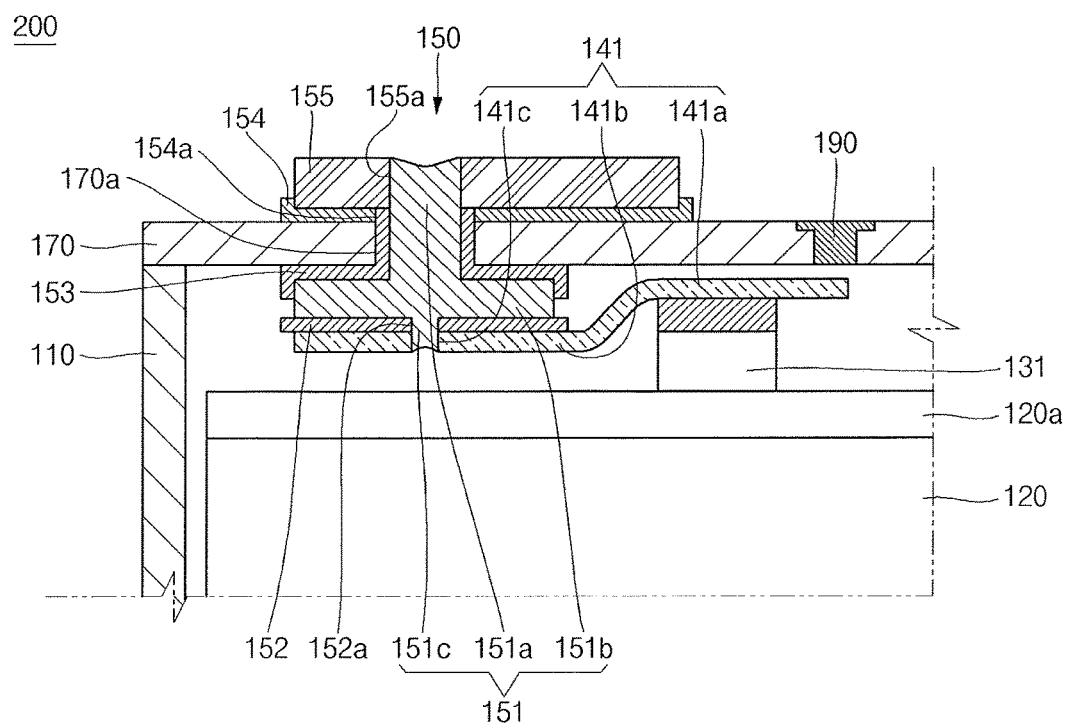
FIG. 5 illustrates a cross-sectional view of the first electrode terminal portion shown in FIG. 3.

FIG. 3 is a perspective view of a first electrode terminal portion of the secondary battery shown in FIG. 1, FIG. 4 is a bottom view of the first electrode terminal portion shown in FIG. 3, and FIG. 5 is a cross-sectional view of the first electrode terminal portion shown in FIG. 3.

Referring to FIGS. 3 to 5, the first electrode terminal portion 150 may include a first electrode terminal 151, an insulation member 152, a gasket 153, a first fastening plate 154, and a first terminal plate 155.

The first electrode terminal 151 may include a body part 151a, a flange 151b, and a protrusion part 151c.

The body part 151a may be shaped as a cylinder and may pass through the cap plate 170 to be extended and protruded upwardly a predetermined length.

The flange 151b may be formed to horizontally extend from a bottom side portion of the body part 151a and may prevent the first electrode terminal 151 from being dislodged from the cap plate 170.

The protrusion part 151c may be formed under the body part 151a and the flange 151b. The protrusion part 151c may be inserted into the electrode terminal hole 141c of the first current collector plate 141 to be electrically connected and coupled to the electrode terminal hole 141c by riveting or welding. In addition, the protrusion part 151c may pass through the insulation member 152 to be electrically connected to the first current collector plate 141 to constitute a fuse.

The first electrode terminal 151 may be made of a metal, such as aluminum or an aluminum alloy, for example.

The insulation member 152 may be installed between the first current collector plate 141 and the flange 151b of the first electrode terminal 151. An electrode terminal hole 152a, through which the protrusion part 151c of the first electrode terminal 151 may pass, may be formed in the insulation member 152. The insulation member 152 may insulate the flange 151b of the first electrode terminal 151 from the first current collector plate 141. Therefore, the first electrode terminal 151 may be electrically connected to the first current collector plate 141 through the protrusion part 151c.

The gasket 153 may be formed between the first electrode terminal 151 and a cap plate terminal hole 170a of the cap plate 170 using an insulating material, thereby sealing a gap between the first electrode terminal 151 and the cap plate 170. Therefore, the gasket 153 may prevent external moisture from permeating into the secondary battery 100 and may prevent the electrolyte accommodated within the secondary battery 100 from effusing to an outside.

In addition, the gasket 153 may be formed between the first electrode terminal 151 and the first fastening plate 154, thereby insulating the first electrode terminal 151 from the first fastening plate 154.

The first fastening plate 154 may include an electrode terminal hole 154a formed therein to allow the first electrode terminal 151 to pass therethrough. The first fastening plate 154 may be fitted onto the first electrode terminal 151 upwardly protruding from the cap plate 170 to be coupled to a top portion of the cap plate 170. When the first fastening plate 154 is formed of a conductive material, the cap plate 170 may be electrically connected to the first terminal plate 155.

The first terminal plate 155 may include an electrode terminal hole 155a formed therein to allow the first electrode terminal 151 to pass therethrough. The first terminal plate 155 may be fitted onto the first electrode terminal 151 upwardly protruding from the cap plate 170 and coupled to a top portion of the first fastening plate 154. In addition, the first terminal plate 155 may be coupled to the first electrode terminal 151 upwardly protruding from the cap plate 170 by riveting or welding.

The first terminal plate 155 may be made of a metal, such as aluminum or an aluminum alloy, for example.

The second electrode terminal portion 160 may include a second electrode terminal 161, a gasket 163, a second fastening plate 164, and a second terminal plate 165.

The second electrode terminal 161 may include a body part 161a and a flange 161b.

The body part 161a may be shaped as a cylinder, and the flange 161b may be extended and protruded horizontally a predetermined length from a side portion of the body part 161a and may prevent the second electrode terminal 161 from being dislodged from the cap plate 170.

A region of the body part 161a, which may be formed above the flange 161b, may pass through the cap plate 170 to be extended and protruded upwardly a predetermined length. In addition, a region of the body part 161a, which may be formed under the flange 161b, may be inserted into the electrode terminal hole of the second current collector plate 142 to be electrically connected and coupled to the electrode terminal hole by riveting or welding. In addition, since the flange 161b may be brought into contact with the second current collector plate 142, the flange 161b may be electrically connected to the second current collector plate 142.

The second electrode terminal 161 may be made of a metal, such as copper or a copper alloy, for example.

The gasket 163 may be formed between the second electrode terminal 161 and the cap plate 170 using an insulating material, thereby sealing a gap between the second electrode terminal 161 and the cap plate 170. Therefore, the gasket 163 may prevent external moisture from permeating into the secondary battery 100 and may prevent the electrolyte accommodated within the secondary battery 100 from effusing to an outside.

In addition, the gasket 163 may be formed between the second electrode terminal 161 and the second fastening plate 164, thereby insulating the second electrode terminal 161 from the second fastening plate 164.

The second fastening plate 164 may include an electrode terminal hole formed therein to allow the second electrode terminal 161 to pass therethrough. The second fastening plate 164 may be fitted into the second electrode terminal 161 upwardly protruding from the cap plate 170 to be coupled to a top portion of the cap plate 170. The second fastening plate 164 may be made of an insulating material to insulate the second terminal plate 165 from the cap plate 170.

The second terminal plate 165 may include an electrode terminal hole formed therein to allow the second electrode terminal 161 to pass therethrough. The second terminal plate 165 may be fitted onto the second electrode terminal 161 upwardly protruding from the cap plate 170 to be coupled to a top portion of the second fastening plate 164. In addition, the second terminal plate 165 may be coupled to the second electrode terminal 161 upwardly protruding from the cap plate 170 by riveting or welding.

The second terminal plate 165 may be made of a different metal from the second electrode terminal 151, such as aluminum or an aluminum alloy, for example.

The protrusions may be formed only on the first electrode terminal 151, and only the protrusion part 151c of the first electrode terminal 151 may be electrically connected to the first current collector plate 141. The flange 151b may be insulated from the first current collector plate 141 by the insulation member 152. By contrast, the flange 161b of the second electrode terminal 161 may be electrically connected to the second current collector plate 142. Therefore, since the protrusion part 151c of the first electrode terminal 151 forms a narrower current path than the second electrode terminal 161, the protrusion part 151c may function as a fuse. For example, when an over-current flows, the protrusion part 151c may be melted due to an increase in the temperature. In such a case, an electrical connection between the first current collector plate 141 and the first electrode terminal 151 may be broken.

The cap plate 170 may be coupled to a top portion of the case 110 and may seal the opening of the case 110. In addition, when the cap plate 170 may be coupled to the top portion of the case 110, the cap plate 170 may be electrically connected to the case 110. The cap plate 170 may include electrode terminal holes formed therein to allow the first electrode terminal 151 and the second electrode terminal 161 to pass therethrough and protrude. The cap plate 170 may further include a safety vent 180 and an electrolyte injection unit 190.

The cap plate 170 may be made of a same material as the case 110. However, exemplary embodiments do not limit the material of the cap plate 170 to those disclosed herein.

The safety vent 180 may be centrally positioned on the cap plate 170. The safety vent 180 may be installed as a separate member in a vent hole that passes through the cap plate 170, or may be integrally formed with the cap plate 170. When the internal pressure of the secondary battery 100 increases due to, for example, overcharging, the safety vent 180 may be ruptured, thereby preventing the secondary battery 100 from exploding.

The electrolyte injection unit 190 may include an electrolyte injection hole and a plug. The electrolyte injection hole may allow an electrolyte to be injected into the secondary battery 100 and the plug may close the electrolyte injection hole to prevent the electrolyte accommodated therein from effusing to the outside of the secondary battery 100.

The secondary battery 100 according to exemplary embodiments may include the insulation member 152 between the first electrode terminal 151 and the first current collector plate 141, and the protrusion part 151c formed on the first electrode terminal 151 may pass through the insulation member 152 to be electrically connected to the first current collector plate 141 to constitute a fuse. Therefore, with only the configuration of the electrode terminal portion 150 and without installing a separate member in the secondary battery 100, the flow of current may be cut off when over-current flows due to overcharging or abnormality, thereby preventing the secondary battery 100 from exploding.

Figure 6:
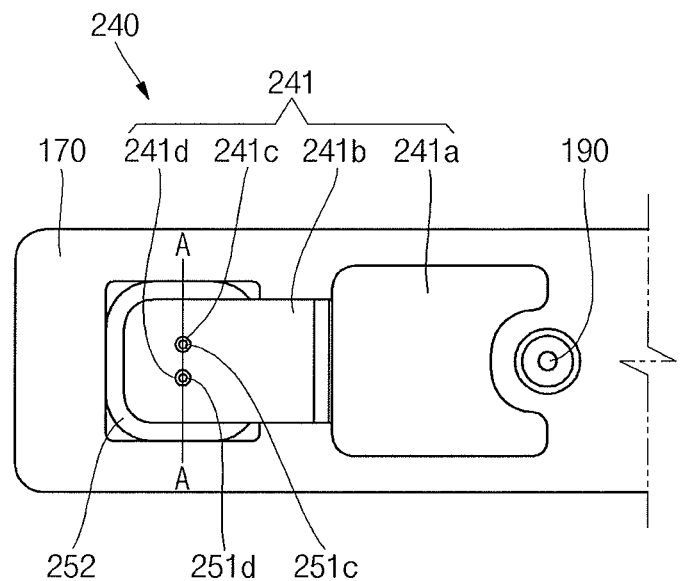
FIG. 6 illustrates bottom view of a first electrode terminal portion of a secondary battery according to another exemplary embodiment.
Figure 7:
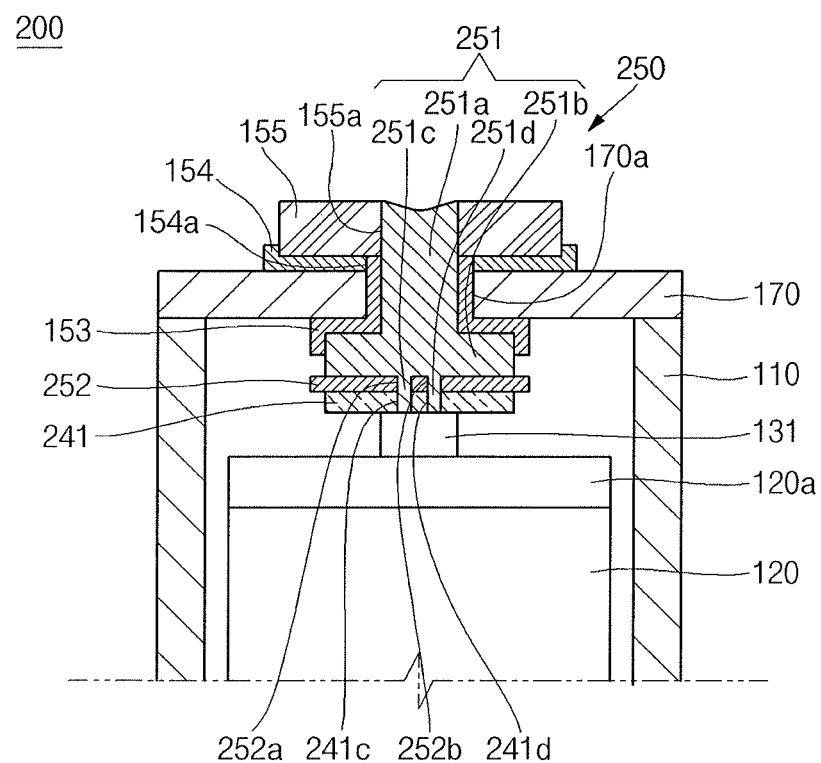
FIG. 7 illustrates a cross-sectional view of the first electrode terminal portion shown in FIG. 6.

FIG. 6 is a bottom view of a first electrode terminal portion of a secondary battery according to another exemplary embodiment and FIG. 7 is a cross-sectional view of the first electrode terminal portion shown in FIG. 6.

Referring to FIGS. 6 and 7, the secondary battery 200 according to another exemplary embodiment may include a case 110, an electrode assembly 120, an electrode tab 130 including the first electrode tab 131, a current collector plate 240, a first electrode terminal portion 250, a second electrode terminal portion 160, a cap plate 170, a safety vent 180, and an electrolyte injection unit 190. In the present exemplary embodiment, the same functional component is denoted by the same reference numeral as in the previous exemplary embodiment, and the following description will focus on differences between the present and previous exemplary embodiments.

The current collector plate 240 may include a first current collector plate 241 and a second current collector plate 142. The first current collector plate 241 may be coupled to the first electrode tab 131 and may establish an electrical path for the electrode tab 130.

The first current collector plate 241 may include an electrode tab connecting part 241a and an electrode terminal connecting part 241b, and a first electrode terminal hole 241c and a second electrode terminal hole 241d may be formed in the electrode terminal connecting part 241b.

A first protrusion part 251c and a second protrusion part 251d of the first electrode terminal 251 may be inserted into the first electrode terminal hole 241c and the second electrode terminal hole 241d, respectively, such that the electrode terminal connecting part 241b may be electrically connected to a first electrode terminal 251 of the first electrode terminal portion 250.

The first electrode terminal portion 250 may include a first electrode terminal 251, an insulation member 252, a gasket 153, a first fastening plate 154, and a first terminal plate 155.

The first electrode terminal 251 may include a body part 251a, a flange 251b, and the first protrusion part 251c and the second protrusion part 251d.

The first protrusion part 251c and the second protrusion part 251d may be formed under the body part 251a and the flange 251b. The first protrusion part 251c and the second protrusion part 251d may be formed at a region where a line A-A passing through both of the first protrusion part 251c and the second protrusion part 251d may be perpendicular to a lengthwise direction of the first current collector plate 241. For example, the first protrusion part 251c and the second protrusion part 251d may be equidistantly spaced apart from the first electrode tab 131. In addition, the first protrusion part 251c and the second protrusion part 251d may be inserted into the first electrode terminal hole 241c and the second electrode terminal hole 241d of the first current collector plate 241, respectively, to be electrically connected and coupled to the first and second electrode terminal holes 241c and 241d by riveting or welding. In addition, the first protrusion part 251c and the second protrusion part 251d may pass through the insulation member 252 to be electrically connected to the first current collector plate 241 to constitute a fuse.

The insulation member 252 may be installed between the first current collector plate 241 and the flange 251b of the first electrode terminal 251. A first electrode terminal hole 252a and a second electrode terminal hole 252b, through which the first protrusion part 251c and the second protrusion part 251d of the first electrode terminal 251, respectively, may pass, may be formed in the insulation member 252. The insulation member 252 may insulate the flange 251b of the first electrode terminal 251 from the first current collector plate 241. Therefore, the first electrode terminal 251 may be electrically connected to the first current collector plate 241 through the first protrusion part 251c and the second protrusion part 251d.

The first protrusion part 251c and the second protrusion part 251d of the first electrode terminal 251 may be electrically connected to the first current collector plate 241, and the flange 251b may be insulated from the first current collector plate 241 by the insulation member 252. Therefore, since the first protrusion part 251c and the second protrusion part 251d of the first electrode terminal 251 may each function as fuses of the first protrusion part 251c and the second protrusion part 251d of the first electrode terminal 251, the first electrode terminal portion 250 may be provided with two fuses.

Additionally, the first protrusion part 251c and the second protrusion part 251d may prevent the first electrode terminal 251 from being rotated in a state in which the first electrode terminal 251 passes through the first fastening plate 154 and the first terminal plate 155.

When an over-current flows in the secondary battery 200 due to overcharging or abnormality, the secondary battery 200 including two fuses may more stably cut off the flow of current, compared to the secondary battery 200 including a single fuse, thereby preventing the secondary battery 200 from exploding.

Figure 8:
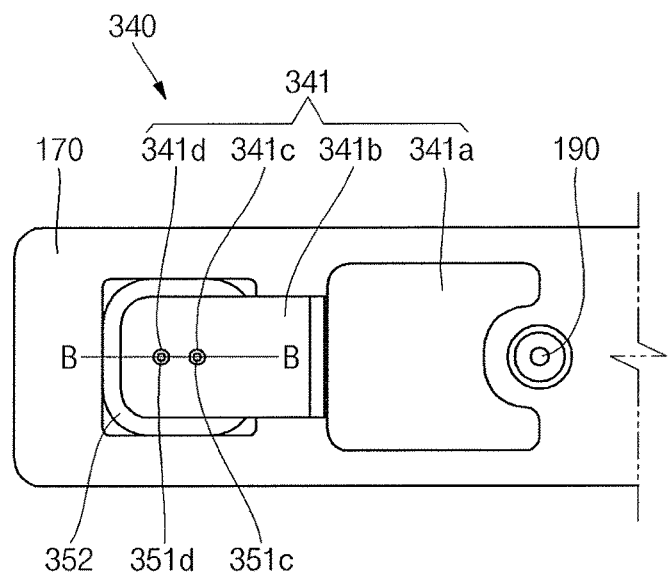
FIG. 8 illustrates a bottom view of a first electrode terminal portion of a secondary battery according to still another exemplary embodiment.
Figure 9:
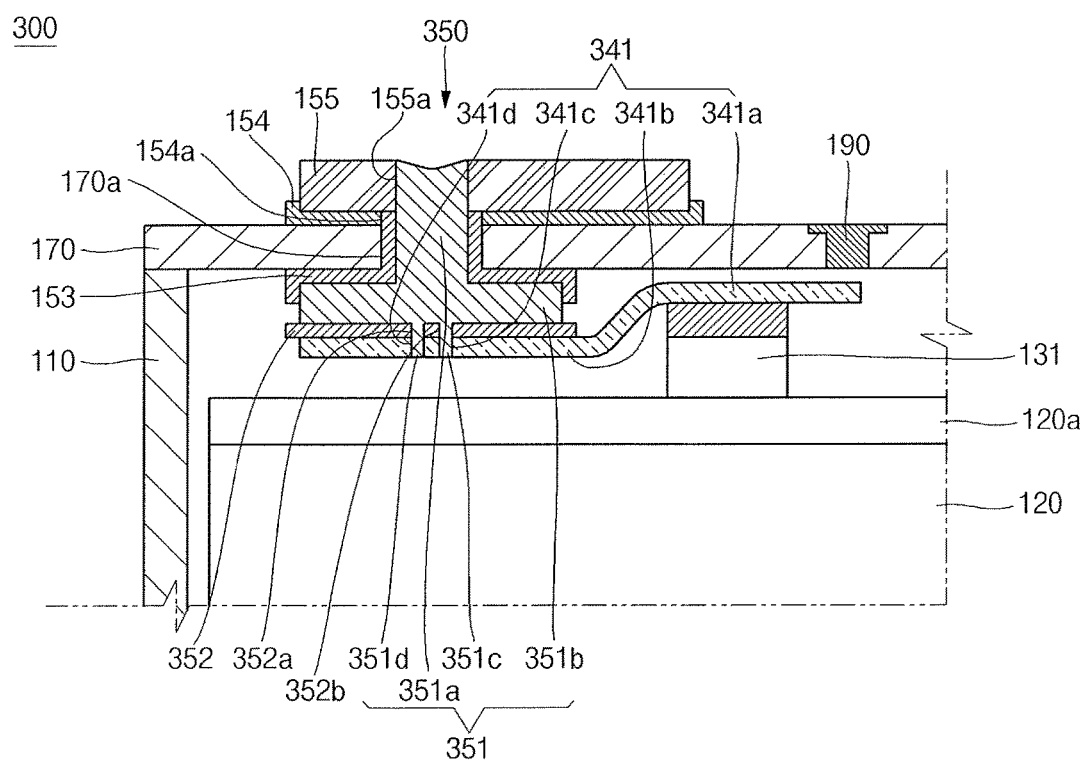
FIG. 9 illustrates a cross-sectional view of the first electrode terminal portion shown in FIG. 8.

FIG. 8 is a bottom view of a first electrode terminal portion of a secondary battery according to still another exemplary embodiment, and FIG. 9 is a cross-sectional view of the first electrode terminal portion shown in FIG. 8.

Referring to FIGS. 8 and 9, the secondary battery 300 according to still another exemplary embodiment may include a case 110, an electrode assembly 120, an electrode tab 130 including the first electrode tab 131, a current collector plate 340, a first electrode terminal portion 350, a second electrode terminal portion 160, a cap plate 170, a safety vent 180, and an electrolyte injection unit 190. In the present exemplary embodiment, the same functional component is denoted by the same reference numeral as in the previous exemplary embodiment, and the following description will focus on differences between the present and previous exemplary embodiments.

The current collector plate 340 may include a first current collector plate 341 and a second current collector plate 142. The first current collector plate 341 may be coupled to the first electrode tab 131 and may establish an electrical path for the electrode tab 130.

The first current collector plate 341 may include an electrode tab connecting part 341a and an electrode terminal connecting part 341b, and a first electrode terminal hole 341c and a second electrode terminal hole 341d may be formed in the electrode terminal connecting part 341b.

A first protrusion 351c and a second protrusion 351d of the first electrode terminal 351 may be inserted into the first electrode terminal hole 341c and the second electrode terminal hole 341d, respectively, such that the electrode terminal connecting part 341b may be electrically connected to the first electrode terminal 351.

The first electrode terminal portion 350 may include a first electrode terminal 351, an insulating member 352, a gasket 153, a first fastening plate 154, and a first terminal plate 155.

The first electrode terminal 351 may include a body part 351a, a flange 351b, a first protrusion 351c, and the second protrusion 351d.

The first protrusion 351c and the second protrusion 351d may be formed under the body part 351a and the flange 351b. The first protrusion 351c and the second protrusion 351d may be formed at a region where a line B-B passing through both of the first protrusion part 351c and the second protrusion part 351d may be parallel to a lengthwise direction of the first current collector plate 341. For example, the first protrusion 351c and the second protrusion 351d may be sequentially formed in a lengthwise direction of the first current collector plate 341. The lengthwise direction being in a direction of the first electrode tab 131. In addition, the first protrusion 351c and the second protrusion 351d may be inserted into the first electrode terminal hole 341c and the second electrode terminal hole 341d of the first current collector plate 341, respectively, to be electrically connected and coupled to the first and second electrode terminal holes 341c and 341d by riveting or welding. In addition, the first protrusion part 351c and the second protrusion part 351d may pass through the insulation member 352 to be electrically connected to the first current collector plate 341 to constitute a fuse.

The insulating member 352 may be installed between the first current collector plate 341 and the flange 351b of the first electrode terminal 351. A first electrode terminal hole 352a and a second electrode terminal hole 352b, through which the first protrusion 351c and the second protrusion 351d of the first electrode terminal 351 may pass, may be formed in the insulating member 352. The insulating member 352 may insulate the flange 351b of the first electrode terminal 351 from the first current collector plate 341. Therefore, the insulating member 352 may insulate the flange 351b of the first electrode terminal 351 from the first current collector plate 341. Therefore, the first electrode terminal 351 may be electrically connected to the first current collector plate 341 through the first protrusion 351c and the second protrusion 351d.

Since the first protrusion 351c and the second protrusion 351d of the first electrode terminal 351 may each function as fuses, the first electrode terminal portion 350 may be provided with two fuses. In addition, since the first protrusion 351c and the second protrusion 351d may be sequentially formed along a path of current flowing through the first electrode plate of the electrode assembly 120, the first electrode tab 131, the first current collector plate 341, and the first electrode terminal 351, the first protrusion 351*c* closer to the first electrode tab 131 may operate earlier than the second protrusion 351*d* when an over-current flows. In such a manner, an operating sequence of the respective fuses may be determined.

In the secondary battery 300 according to still another exemplary embodiment, the order of priority is given to two fuses, and when an over-current flows in the secondary battery 300 due to overcharging or abnormality, the flow of current may be more stably cut off by the two fuses formed in the secondary battery 300, compared to a case when the secondary battery 300 includes two fuses equidistantly spaced apart from the first current collector plate 341, thereby preventing the secondary battery 300 from exploding.

Therefore, the secondary battery according to exemplary embodiments may further include a protrusion formed in the first electrode terminal portion depending on the purpose. For example, three or more fuses may be formed in the first electrode terminal portion. In addition, the order of priority for the respective fuses may be determined by adjusting distances between each of the respective fuses and the first electrode tab.

By way of summation and review, a secondary battery may include a case for housing the electrode assembly together with an electrolyte and a cap assembly installed to seal the case. In addition, electrode tabs and electrode terminals may be connected to the electrode assembly and exposed or protruded through the cap plate. When an over-current flows in the secondary battery due to overcharging or abnormality, explosion of the secondary battery may result. Accordingly, there is a need for a secondary battery having improved safety.

Exemplary embodiments may provide a secondary battery including a fuse in an electrode terminal. As described above, the secondary battery according to exemplary embodiments may include a protrusion formed in an electrode terminal portion to function as a fuse, thereby preventing the secondary battery from exploding by cutting off the flow of current when an over-current flows due to overcharging or abnormality.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery comprising:
an electrode assembly including a first electrode plate, a second electrode plate and a separator;
a current collector plate electrically connected to the electrode assembly;
a case accommodating the electrode assembly, the current collector plate and an electrolyte; and
an electrode terminal portion electrically connected to the current collector plate and protruding to an outside of the case, the electrode terminal portion including at least one protrusion part extending from the electrode terminal portion inside the case to electrically connect to the current collector plate, and
an insulation member insulating the electrode terminal portion from the current collector plate, the at least one protrusion part passing through the insulation member such that the electrode terminal portion is electrically connected to the current collector plate only through the at least one protrusion part, the at least one protrusion part being meltable in an overcurrent condition of the secondary battery to disconnect the electrode terminal portion from the current collector plate.

2. The secondary battery as claimed in claim 1, wherein the electrode terminal portion includes a flange horizontally extending from a side portion of the electrode terminal portion and the insulation member is located between the flange and the current collector plate.

3. The secondary battery as claimed in claim 1, wherein an electrode tab is electrically connected to one end of the current collector plate and the at least one protrusion part of the electrode terminal portion is electrically connected to another end of the current collector plate.

4. The secondary battery as claimed in claim 1, wherein the at least one protrusion part includes a plurality of protrusions.

5. The secondary battery as claimed in claim 4, wherein the protrusions are spaced equidistant from an electrode tab.

6. The secondary battery as claimed in claim 4, wherein the protrusions are sequentially located in a lengthwise direction of the current collector plate, such that one protrusion is closer to an electrode tab than another protrusion.

7. The secondary battery as claimed in claim 1, wherein the electrode terminal portion is a first electrode terminal, the current collector plate is a first current collector plate and the secondary battery further includes a second electrode terminal, electrically connected to a second current collector plate.

8. The secondary battery as claimed in claim 7, wherein a current path between the first electrode terminal and the first current collector plate is narrower than a current path between the second electrode terminal and the second current collector plate.

9. The secondary battery as claimed in claim 1, wherein the electrode terminal portion further includes a body part that protrudes to the outside of the case and a flange extending from a bottom side of the body part the at least one protrusion part being under the body part and the flange and vertically aligned with the body part.

10. The secondary battery as claimed in claim 9, wherein a diameter of the protrusion part is less than a diameter of the body part.

* * * * *